United States Patent
Sekimoto et al.

[19]

[11] Patent Number: 6,032,893
[45] Date of Patent: Mar. 7, 2000

[54] FISHING REEL

[75] Inventors: Akio Sekimoto, Iruma; Kazuya Nanbu, Tokorozawa, both of Japan

[73] Assignee: Daiwa, Seiko, Inc, Tokyo, Japan

[21] Appl. No.: 09/160,240

[22] Filed: Sep. 25, 1998

[30] Foreign Application Priority Data

Sep. 30, 1997 [JP] Japan ................................... 9-308072

[51] Int. Cl.[7] ................................................ A01K 89/00
[52] U.S. Cl. .......................... 242/283; 74/545; D22/140
[58] Field of Search .................................. 242/283, 223, 242/282, 284, 311; D22/140, 141; 74/545

[56] References Cited

U.S. PATENT DOCUMENTS

| | | | |
|---|---|---|---|
| 3,011,362 | 12/1961 | Cronholm | 242/284 X |
| 3,038,682 | 6/1962 | Yeada | 242/282 X |
| 3,089,663 | 5/1963 | Kirby, Sr. | 242/223 |
| 3,224,703 | 12/1965 | Clark | 242/282 X |
| 3,375,993 | 4/1968 | Hayes | 242/284 |
| 3,990,323 | 11/1976 | Kamikawa | 242/284 |

FOREIGN PATENT DOCUMENTS

| | | |
|---|---|---|
| 56-68473 | 10/1954 | Japan . |
| 3-74267 | 7/1991 | Japan . |
| 7-163277 | 6/1995 | Japan . |

*Primary Examiner*—Donald P. Walsh
*Assistant Examiner*—Emmanuel M. Marcelo
*Attorney, Agent, or Firm*—Liniak, Berenato, Longacre & White

[57] ABSTRACT

In a fishing reel, a handle (A) is mounted on a drive shaft of a take-up drive mechanism. The drive shaft is rotatably supported within a reel main body. The handle includes a handle arm, a T-shaped handle knob supported rotatably on one end portion of the handle arm by a support shaft, a balancer consisting of a balance forming member fixed to the other end portion of the handle arm by another support shaft, and a cap mounted on the handle arm. The handle arm includes a linear portion extending from the center portion of the handle arm toward one end portion thereof, a linear portion extending from the center portion of the handle arm toward the other end portion thereof, a bent portion formed such that it is bent outwardly in the axial direction of the drive shaft, and a linear portion extending from the bent portion.

8 Claims, 2 Drawing Sheets

FISHING REEL

BACKGROUND OF THE INVENTION

1. Field of the Invention

The present invention relates to a fishing reel which is improved in the rotation balance of a handle arm used to wind a fishing line around a spool.

2. Description of the Related Art

A handle is mounted on a drive shaft of a take-up drive mechanism provided within a reel main body in order to wind a fishing line around a spool. As disclosed in Japanese Utility Model Publication No. 56-68473 of Showa, the handle has a handle arm including a handle knob in one portion thereof, and a balancer in the other portion thereof. The balancer is used to keep the balance of the handle arm.

In the above-mentioned structure, the handle knob to be mounted on the handle arm is composed of a shaft portion and a grip portion and is formed in an outwardly projecting shape.

Since the balancer, provided on the counter-handle-knob side of the handle arm, is set such that the weight thereof balances well with the weight of the whole handle knob, the rotation balance of the handle arm is rather good. However, in fact, the whole handle knob has a center of gravity distant outwardly from the position of the handle arm, whereas the balancer has a center of gravity existing substantially in the center of the balancer. That is, the position of center of gravity of the whole handle knob is different from that of the balancer, which makes it difficult to achieve the high-precision balance of the handle arm using the balancer.

In order that a balancer having a weight capable of canceling the weight of the handle knob side portion of the handle arm can be disposed at a position opposed to the handle knob with respect to the drive shaft, Japanese Patent Publication No. 7-163277 of Heisei discloses another structure in which, on the opposite side of the handle knob of the handle arm, there is disposed another balancer which is capable of shifting the center of gravity of the present handle knob. However, in this structure, since the balancer for shifting the center of gravity is additionally provided in the handle arm, the weight of the whole handle arm becomes heavy to thereby worsen the weight balance between the right and left portions of the whole reel, which results in the worsened fishing operation efficiency of the fishing reel.

Japanese Utility Model Publication No. 3-74267 of Heisei discloses a structure in which a balancer for correction of the balance of the handle arm is further provided in the handle arm including a pair of handle knobs to thereby improve the balance of the handle arm. However, in this structure as well, similarly to the former structure, the weight of the whole handle arm becomes heavy to thereby worsen the weight balance between the right and left portions of the whole reel, which results in the worsened fishing operation efficiency of the reel.

The conventional balance improving technique for the handle arm results in additional provision of one or more parts, and the weight increase of the handle arm, that is, the whole fishing reel becomes heavy in weight to worsen the fishing operation efficiency of the fishing reel.

SUMMARY OF THE INVENTION

The present invention aims at eliminating the above drawbacks found in the conventional fishing reels. Accordingly, it is an object of the invention to provide a fishing reel in which the weight and center of gravity of the whole handle knob can be made approximate to the weight and center of gravity of a balancer without increasing the number of parts.

In accomplishing the above object, the present invention provides a fishing reel in which a fishing line can be wound around a spool by rotational operation of a handle mounted on a drive shaft of a take-up drive mechanism of a reel main body. The fishing reel is characterized by a handle arm of the handle, which has a handle knob in one side thereof, a bent portion formed by bending the other side portion of the handle arm outwardly in the axial direction of the drive shaft, and a balance forming member provided on an end of the bent portion of the handle arm.

DETAILED DESCRIPTION OF THE PREFERRED EMBODIMENTS

Figure 1:
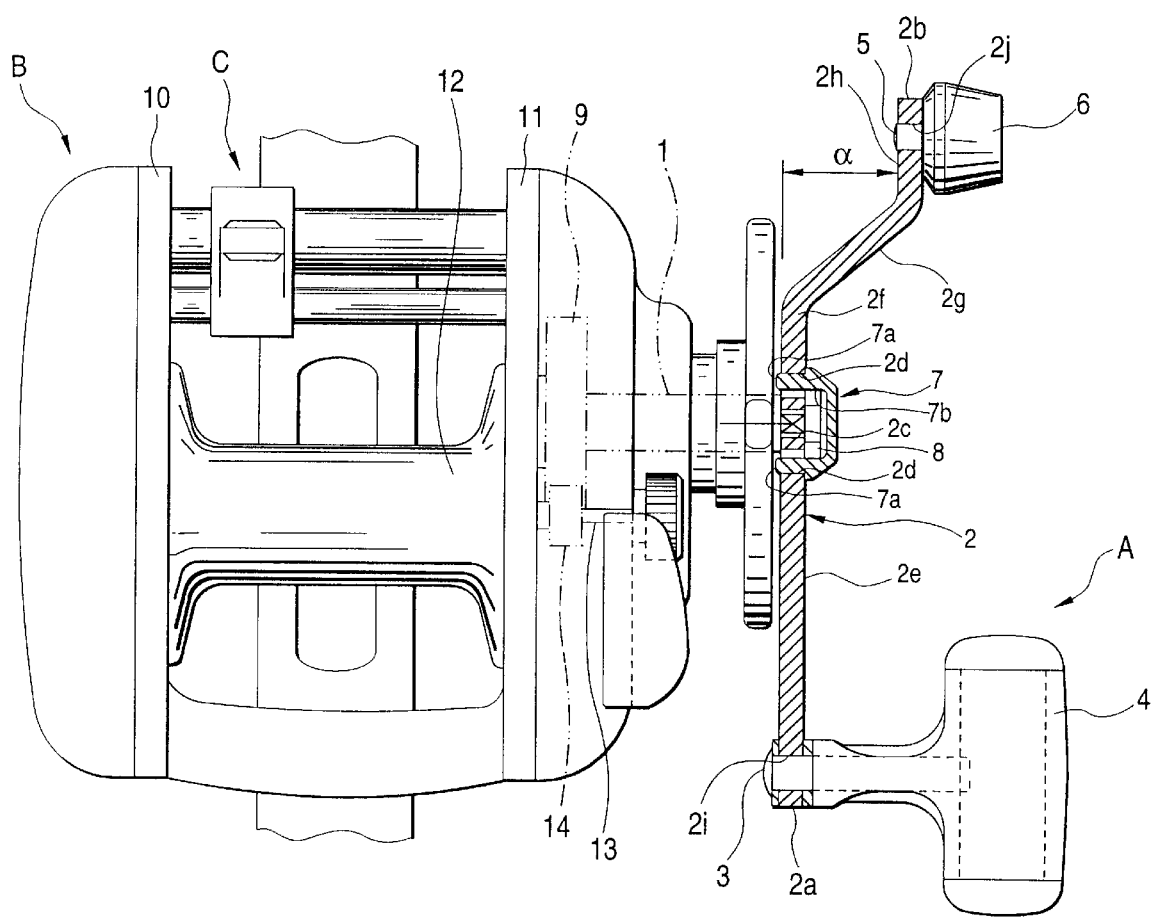
FIG. 1 is a plan view of a fishing reel according to a first embodiment of the invention in which the main portions of a handle of the fishing reel are shown in the form of a sectional side view thereof.

Now, description will be given below of the preferred embodiments of a fishing reel according to the invention with reference to the accompanying drawings.

In brief, in a handle arm employed in the following embodiments of the invention, not only the weight on the balance forming member 6, 4' and support shaft 5 portion thereof balances well with the weight on the handle knob and support shaft 3 portion thereof, but also the position of center of gravity on the balance forming member 6, 4' and support shaft 5 portion thereof is so set as to be approximate to the position of center of gravity on the handle knob 4 and support shaft 3 portion thereof. A good handle rotation balance can be obtained, and the fishing operation efficiency of the fishing reel can be enhanced.

Also, since the balance between the two side portions of the handle arm 2 is attained due to the shape of the handle arm 2, not only the structure of the handle is simple and the weight of the whole handle A as well as the number of parts are prevented from increasing, but also a good handle rotation balance can be obtained, so that the fishing operation efficiency and portability of the fishing reel can be enhanced further.

Figure 2:
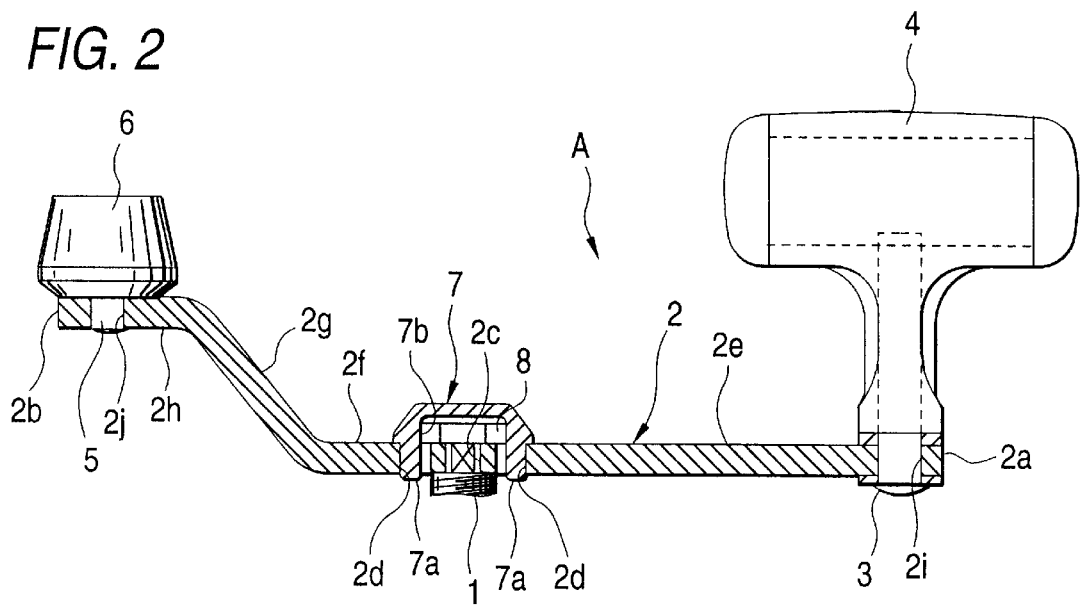
FIG. 2 is a sectional side view of the main portions of the handle shown in FIG. 1.
Figure 3:
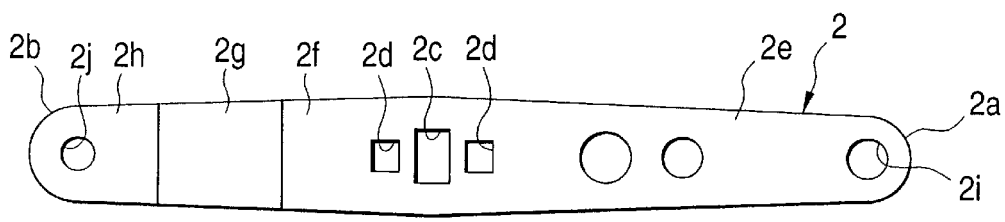
FIG. 3 is a plan view of a handle arm employed in the first embodiment.

FIGS. 1 to 3 show a first embodiment of a fishing reel according to the invention. In particular, FIG. 1 is a plan view of a fishing reel in which the main portions of a handle of the fishing reel are shown in the form of a sectional side view thereof; FIG. 2 is a sectional side view of the main portions of the handle; and, FIG. 3 is a plan view of a handle arm employed in the first embodiment.

A handle A, which is used in a fishing reel according to the first embodiment, comprises a drive shaft 1 of a take-up drive mechanism which is rotatably supported within a reel main body B of the present fishing reel, a handle arm 2 mounted on the drive shaft 1, a T-shaped handle knob 4 supported rotatably on one end portion 2a of the handle arm 2 by a support shaft 3, a balancer 6 consisting of a balance forming member fixed to the other end portion 2b of the handle arm 2 by another support shaft 5, and a cap 7 mounted on the handle arm 2.

In the handle arm 2, in more particular, in the center portion of the weight balance of the whole of the handle arm 2, handle knob 4 and balancer 6 consisting of the balance forming member, there is opened up a square hole 2c, while the free end of the drive shaft 1 is fitted into the square hole 2c in a rotation preventive manner and is prevented against removal by a nut 8.

On the two sides of the square hole 2c, there are formed square holes 2d and 2d, while securing hooks 7a and 7a provided in the cap 7 are respectively inserted into and secured to the square holes 2d and 2d.

In the cap 7, there is formed a recessed portion 7b into which the nut 8 can be fitted.

The handle arm 2 includes a linear portion 2e which extends from the center portion of the handle arm 2 toward one end portion 2a thereof, a linear portion 2f extending from the center portion of the handle arm 2 toward the other end portion 2b thereof, a bent portion 2g formed such that it is bent outwardly in the axial direction of the drive shaft 1, and a linear portion 2h extending from the present bent portion.

The amount $\alpha$ of axially outward projection of the linear portion 2h of the handle arm 2 with respect to the linear portion 2e of the handle arm 2 is set at a position where the center of gravity of the total weight of the linear portion 2e, handle knob 4 and support shaft 3 is equal to the center of gravity of the total weight of the linear portion 2f, bent portion 2g, linear portion 2h, support shaft 5 and balancer 6 consisting of a balance forming member.

One end of the support shaft 3 is inserted into a through hole 2i opened up in one end portion 2a of the handle arm 2 and is staked and fixed there, whereas one end of the support shaft 5 is inserted into a through hole 2j opened up in the other end portion 2b of the handle arm 2 and is staked and fixed there.

Now, the present fishing reel comprises the drive shaft 1 which is rotatably supported within the reel main body B, a drive gear 9 frictionally coupled to the outer periphery of the drive shaft 1, a spool 12 interposed between the left and right side frames 10 and 11 of the reel main body B, a spool shaft 13 on which the spool 12 is fixed, and a pinion 14 which is fitted with the spool shaft 13 and is meshingly engaged with the drive gear 9.

Between the left and side frames 10 and 11 and in front of the spool 12, there is provided a fishing line guide device C.

When using the present fishing reel, if an operator grips and rotates the handle knob 4 by hand, then the handle arm 2, drive shaft 1 and drive gear 9 are rotated, so that the spool shaft 13 and spool 12 are also rotated through the pinion 14.

With use of the fishing reel structured in the above-mentioned manner, not only the weight of the balancer 6 consisting of the balance forming member and support shaft 5 balances well with the weight of the handle knob 4 and support shaft 3, but also the position of center of gravity of the balancer 6 consisting of the balance forming member and support shaft 5 is approximate to the position of center of gravity of the handle knob 4 and support shaft 3, thereby being able to obtain a good handle rotation balance, so that the fishing operation efficiency of the fishing reel can be enhanced.

Also, since the balance between the two side portions of the handle arm 2 is attained due to the shape of the handle arm 2, not only the structure of the handle is simple and the weight of the whole handle A as well as the number of parts are prevented from increasing, but also a good handle rotation balance can be obtained, so that the fishing operation efficiency and portability of the fishing reel can be enhanced further.

Figure 4:
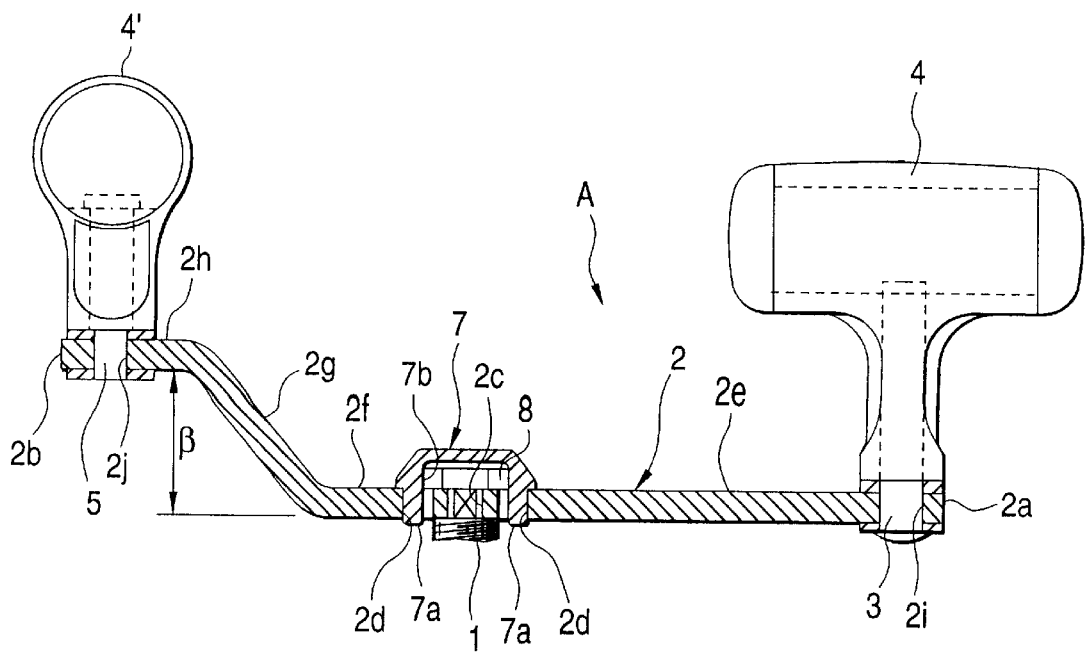
FIG. 4 is a sectional side view of the main portions of a handle employed in a second embodiment of a fishing reel according to the invention.

Now, FIG. 4 shows a second embodiment of a fishing reel according to the invention and, in particular, FIG. 4 is a sectional side view of the main portions of a handle employed in the second embodiment.

In the second embodiment, a handle A of a fishing reel comprises a handle arm 2 which is mounted on a drive shaft 1, a T-shaped handle knob 4 supported rotatably on one end portion 2a of the handle arm 2 by a support shaft 3, another handle knob 4' consisting of a balance forming member fixed to the other end portion 2b of the handle arm 2 by another support shaft 5, and a cap 7 mounted on the handle arm 2.

The handle knob 4' consisting of a balance forming member is a handle knob which is formed in a T-like shape and includes a short shaft portion.

The remaining portions of the second embodiment are substantially identical in structure with those of the previously described first embodiment.

The amount $\beta$ of axially outward projection of the linear portion 2h of the handle arm 2 with respect to the linear portion 2e of the handle arm 2 is set at a position where the center of gravity of the total weight of the linear portion 2e, handle knob 4 and support shaft 3 is equal to the center of gravity of the total weight of the linear portion 2f, bent portion 2g, linear portion 2h, support shaft 5 and handle knob 4' consisting of a balance forming member.

When a fishing reel is structured as in the second embodiment, not only the weight of the handle knob 4' consisting of the balance forming member and support shaft 5 balances well with the weight of the handle knob 4 and support shaft 3, but also the position of center of gravity of the handle knob 4' consisting of the balance forming member and support shaft 5 is approximate to the position of center of gravity of the handle knob 4 and support shaft 3, thereby being able to obtain a good handle rotation balance, so that the fishing operation efficiency of the fishing reel can be enhanced.

As in the above-mentioned structure, when, as the handle knob, there are provided not only the T-shaped handle knob 4 but also the T-shaped handle knob 4' including a short shaft portion, then a fishing line take-up operation can be executed selectively according to the load required for the handle operation, thereby being able to facilitate the handle operation.

By the way, the handle knob 4' consisting of a balance forming member may also be formed of a flat-shaped handle knob.

If the flat-shaped handle knob is used, when the handle A is rotated by applying a force thereunto, an operator's hand can be put on the handle knob smoothly, thereby being able to facilitate the application of the force to the handle A.

In the above-mentioned description, as a fishing reel to which the invention is applied, there is used a double bearing type fishing reel. However, this is not limitative but, of course, the invention can also apply to other kinds of fishing reels.

According to the present invention, not only the weight of the balance forming member and its associated support shaft balances well with the weight of the handle knob and its associated support shaft, but also the position of center of gravity of the balance forming member and its associated support shaft is approximate to the position of center of gravity of the handle knob and its associated support shaft, thereby being able to obtain a good handle rotation balance, so that the fishing operation efficiency of the fishing reel can be enhanced.

Also, since the balance between the two side portions of the handle arm is attained due to the shape of the handle arm, not only the structure of the handle is simple and the weight of the whole handle as well as the number of parts are prevented from increasing, but also a good handle rotation balance can be obtained, so that the fishing operation efficiency and portability of the fishing reel can be enhanced further.

What is claimed is:

1. A fishing reel in which a fishing line can be wound about a spool by rotational operation of a handle mounted on a drive shaft of a take-up drive mechanism of a reel main body, said handle comprising:

a handle arm rotatably mounted about an axis and having a first and a second portion extending outwardly in opposite directions from said axis, said first portion substantially extending in a radial direction;

a handle knob disposed on an end of said first portion of said handle arm;

a bent portion formed by bending said second portion of said handle arm outwardly in an axial direction of said shaft; and a balance forming member disposed on an end of said second portion;

wherein a first center of gravity of said first portion together with said handle knob and a second center of gravity of said second portion of said handle arm together with said balance forming member each lie substantially in a common axial plane.

2. A fishing reel according to claim 1, wherein said balance forming member includes a balancer.

3. A fishing reel according to claim 1, wherein said balance forming member includes another handle knob.

4. A fishing reel according to claim 1, wherein said end of said bent portion is parallel to said one side portion of said handle arm and distanced from said one side portion in said axial direction of said drive shaft.

5. A handle for a fishing reel, said handle rotatably mounted to said fishing reel about an axis, said handle comprising;

a non-symmetrical handle arm including a first portion and a second portion, said first and second portions extending in opposite directions from a rotation point on said axis, said first portion including a linear member extending outwardly in a radial direction, said second portion extending outwardly in both a radial and an axial direction wherein an end of said second portion is substantially axially offset from an end of said first portion;

a handle knob disposed on said end of said first portion; and a balance forming member disposed on said end portion of said second portion of said handle arm.

6. The handle according to claim 5, wherein a center of gravity of said first portion of said handle arm together with said handle knob and a second center of gravity of said second portion of said handle arm together with said balance forming member are spaced substantially equi-distant from said rotation point in both the radial and axial directions.

7. The fishing reel according to claim 6, wherein said linear member of said first portion does not substantially extend in said axial direction and said second portion includes a second linear member extending from said rotation point and a bent portion extending from said second linear portion in said axial direction.

8. The handle according to claim 5, wherein said handle knob comprises a T-shaped handle knob rotatably supported on said end of said first portion of said handle arm.

* * * * *